Patented Apr. 24, 1934

1,956,482

UNITED STATES PATENT OFFICE 1,956,482

PROCESS FOR PREPARING MALEIC ANHYDRIDE AND MALEIC ACID

Fritz Zumstein, Nieder-Ingelheim-on-the-Rhine, Germany, assignor to the firm C. H. Boehringer Sohn, Nieder-Ingelheim-on-the-Rhine, Germany, a society of Germany No Drawing. Application February 7, 1928, Serial No. 252,684. In Germany February 16, 1927

11 Claims. (Cl. 260—116)

It is known that benzene and other aromatic hydrocarbons can be converted into maleic acid by catalytic oxidation.

According to the present invention, maleic acid and maleic anhydride are obtained by treating compounds of the furfurane series, in vapor form, and under certain conditions mixed with steam, with oxygen or free oxygen-containing gas mixtures or gas vapor mixtures (both mixtures being hereinafter referred to as "gas mixtures") in the presence of oxidizing catalysts. As starting materials, the following for example come into consideration:—furan, furfuryl-alcohol, furfural, methylfurfural, oxymethylfurfural and pyromucic acid.

Mixtures of such substances or commercial raw products, as for example, crude furfural or mixtures of, for example, furan compounds with aromatic hydrocarbons or substances, which are capable of forming compounds of the furfurane series, for example by thermal decomposition or by oxidation, as, for example, dehydro-mucic acid, can also be employed.

As catalysts, the usual vapor phase oxidation catalysts can be employed, especially oxides of acid character which are derived from elements having several oxides or metallic salts of acids, which are derived from these oxides, as, for example, vanadium oxide, metal, vanadates, molybdenum oxide, chromates, uranates, etc. In order to increase their efficiency, activating substances, as for example phosphoric acid or boric acid, may also be incorporated with the catalysts. The catalysts can be supported on carriers, for example, pumice-stone, fragments of clay, granulated metals, for example granulated aluminium, roughened metal shavings and the like. The proportions of furan or furan vapor or vapors of furan derivatives and oxygen can be varied within wide limits. The oxygen may be used in excess of that theoretically calculated. In order to moderate any vigorous reaction, especially at higher temperatures, inert gases or vapors—for example, nitrogen, steam or the like—may be added as diluents. It has been found especially advantageous to employ the oxidizing gases—for example, oxygen or air—in considerable excess—for example, in quantities corresponding to 20-100 times of the theoretical—in which case the excess of the oxidizing gas functions at the same time as a diluent. This procedure offers the advantage that exact dosages can be dispensed with, and that it is considerably easier to maintain the reaction temperature constant and at the desired degree and that overheating of the starting material, especially on the surface of the catalysts, can be avoided.

The working temperatures can also vary within wide limits—for example, between 150–500° C. and more. By using a large excess of air or other oxygen containing gases it is possible to carry out the reaction at a relatively low temperature, for example, below 250° C., as shown in Example 2. The process can be carried out at ordinary reduced or increased pressure. By using increased pressure it is, for example, possible to save contact space.

The vaporizing of the substances to be oxidized and the mixing with the oxidizing gases can be effected in any manner, for example, by vaporizing furfural by heat, or by passing steam through heated furfural and then mixing with the oxidizing gas or, for example, by atomizing furfural with air, steam or the like in a space through which hot air is passed. It is also possible to employ 10-20% aqueous crude furfural solutions in the form in which they are obtained in the preparation of furfural from pentosan-containing materials—for example, by atomizing them with hot air.

The process yields as reaction product a mixture of maleic acid and maleic anhydride. The starting material which passes the contact mass unchanged can be recovered and again subjected to the process. It is, however, possible to use up the starting material to such an extent that the recovery of the unused relatively small quantities can be avoided. The result is surprising as it could not have been foreseen that substances which are so sensitive to oxygen—for example, furfural—would produce maleic acid in good yield on catalytic oxidation in the state of vapor with the aid of oxygen or air.

Examples 1. 10 gms. of furfural are allowed to vaporize in the course of 3–5 hours—for example, by being dropped into a vessel heated to 200° C. through which a preheated current consisting of a mixture of 1 part of oxygen and 3 parts of air passes at a speed of 40 litres per hour. The furfural vapor-oxygen mixture is passed without being allowed to cool through a tube 70cms. long and having an internal diameter of 2cms. which is heated to 300–350° C. and is charged with zinc vanadate supported on a contact carrier of granular aluminium. A mixture of water, maleic acid and maleic anhydride as well as small quantities of starting materials condenses in the well cooled receiver.

2. 60 gms. of furfural are vaporized in the course of 4 hours and mixed with a current of air having a speed of 1.5 litres per second and passed over vanadic acid which is supported on granulated pumice-stone and heated to 180° C. The yield amounts to about 90% of theory.

What I claim is:—

1. A method for producing maleic anhydride and maleic acid, which consists in changing compounds of the furfuran series into vapor form, and reacting said vapor with oxygen in the presence of a vapor phase oxidation catalyst.

2. A method for producing maleic anhydride and maleic acid, which consists in vaporizing compounds of the furfuran series, and reacting said vaporized compounds with a free oxygen containing gas in the presence of a vapor phase oxidation catalyst.

3. A method for producing maleic anhydride and maleic acid, which consists in vaporizing compounds of the furfuran series, and reacting said vaporized compounds with an excess of oxygen in the presence of a vapor phase oxidation catalyst.

4. A method for producing maleic anhydride and maleic acid, which consists in vaporizing compounds of the furfuran series, and reacting said vaporized compounds in the presence of a vapor phase oxidation catalyst with air containing an amount of oxygen at least twenty times the theoretical quantity required for the reaction.

5. A method for producing maleic anhydride and maleic acid, which consists in vaporizing compounds of the furfuran series, and oxidizing said vaporized compounds by mixing said compounds with air in the presence of a vapor phase oxidation catalyst, said oxidation being carried on between 150° C. and 500° C.

6. A method as described in claim 1, in which the reaction is carried on at increased pressure.

7. A method as described in claim 1, in which vanadium compounds are used as the vapor phase oxidation catalysts.

8. A method for producing maleic anhydride and maleic acid, which consists in vaporizing compounds of the furfuran series, adding to said vaporized compounds a diluent gas, and reacting the resulting mixture with free oxygen containing gases in the presence of a vapor phase oxidation catalyst.

9. A method for producing maleic anhydride and maleic acid, which consists in vaporizing compounds of the furfuran series, adding steam to said vaporized compounds, and reacting the resultant mixture with a gas containing free oxygen in the presence of a vapor phase oxidation catalyst.

10. A process for producing maleic anhydride and maleic acid, which consists in vaporizing furfural, and reacting said vaporized furfural with an excess of free oxygen containing gases in the presence of a vapor phase oxidation catalyst.

11. A process for producing maleic anhydride and maleic acid, which consists in changing crude furfural into the vapor state, and mixing said vaporized crude furfural with an excess of free oxygen containing gases in the presence of a vapor phase oxidation catalyst.

FRITZ ZUMSTEIN.